(12) United States Patent
Furuya et al.

(10) Patent No.: US 7,134,772 B2
(45) Date of Patent: Nov. 14, 2006

(54) VEHICLE OUTSIDE-MIRROR UNIT INCLUDING LAMP UNIT

(75) Inventors: Kaori Furuya, Isehara (JP); Chiharu Iwata, Isehara (JP)

(73) Assignee: Ichikoh Industries, Ltd., Tokyo (JP)

( * ) Notice: Subject to any disclaimer, the term of this patent is extended or adjusted under 35 U.S.C. 154(b) by 143 days.

(21) Appl. No.: 11/017,234

(22) Filed: Dec. 21, 2004

(65) Prior Publication Data

US 2005/0146886 A1 Jul. 7, 2005

(30) Foreign Application Priority Data

Dec. 24, 2003 (JP) .............................. 2003-427573

(51) Int. Cl.
*B60Q 1/26* (2006.01)
(52) U.S. Cl. ...................... 362/494; 362/545
(58) Field of Classification Search ................ 362/494
See application file for complete search history.

(56) References Cited

U.S. PATENT DOCUMENTS

| | | | | |
|---|---|---|---|---|
| 6,079,858 A | * | 6/2000 | Hicks | .......................... 362/486 |
| 6,139,171 A | * | 10/2000 | Waldmann | .................. 362/494 |
| 6,271,750 B1 | | 8/2001 | Bräutigam et al. | |
| 6,637,917 B1 | * | 10/2003 | Schwanz et al. | ............ 362/487 |
| 6,695,465 B1 | | 2/2004 | Apfelbeck | |
| 6,749,325 B1 | * | 6/2004 | Bukosky et al. | ............ 362/494 |
| 6,932,497 B1 | * | 8/2005 | Huang | ........................ 362/494 |
| 2003/0193815 A1 | * | 10/2003 | Mishimagi | .................. 362/494 |

FOREIGN PATENT DOCUMENTS

| | | |
|---|---|---|
| EP | 1 442 930 A2 | 8/2004 |
| EP | 1 442 934 A1 | 8/2004 |
| JP | 8-142745 A | 6/1996 |
| JP | 2002-19519 A | 1/2002 |
| JP | 2002-096684 A | 4/2002 |
| JP | 2002-362222 A | 12/2002 |

* cited by examiner

*Primary Examiner*—Ali Alavi
*Assistant Examiner*—Hargobind S. Sawhney
(74) *Attorney, Agent, or Firm*—Foley & Lardner LLP

(57) ABSTRACT

A vehicle outside-mirror unit includes a mirror housing having a window; and a lamp unit included in the mirror housing. The lamp unit includes a lamp housing that divides a lamp chamber; a lamp lens; a light source that is fixed to the lamp lens in the lamp chamber; a shielding portion that shields the light source; a light transmitting portion that is provided at a position other than a position corresponding to the shielding portion of the lamp lens, and arranged at the window; and a reflection surface that is provided in the lamp housing in the lamp chamber, and reflects light from the light source to irradiate the light through the light transmitting portion to outside.

10 Claims, 11 Drawing Sheets

VEHICLE OUTSIDE-MIRROR UNIT INCLUDING LAMP UNIT

CROSS-REFERENCE TO RELATED APPLICATIONS

The present document incorporates by reference the entire contents of Japanese priority document, 2003-427573 filed in Japan on Dec. 24, 2003.

BACKGROUND OF THE INVENTION

1) Field of the Invention

The present invention relates to a vehicle outside-mirror unit including a lamp unit.

2) Description of the Related Art

The vehicle outside-mirror unit including a lamp unit of this type includes, for example, ones described in Japanese Patent Application Laid-Open No. 2002-19519, in Japanese Patent Application Laid-Open No. 2002-362222, and in U.S. Pat. No. 6,695,465B2.

The vehicle outside-mirror unit including the lamp unit includes a mirror housing having a window and a lamp unit provided in the mirror housing with a lamp lens arranged at the window.

In the vehicle outside-mirror unit including the lamp unit, when a light source such as a light emitting diode (LED) provided in the lamp housing of the lamp unit is turned on and light is emitted, the light from the light source such as LED is irradiated outside through the lamp lens. As a result, the lamp lens arranged at the window of the mirror housing emits light. The lamp unit used for the vehicle outside-mirror unit is for emitting ornamental light or realizing a turn lamp function such as a signal lamp, or both.

However, the lamp unit used for the vehicle outside-mirror unit is a direct irradiating type lamp unit in which the light from the light source, such as LED, is directly irradiated from the lamp lens to the outside. One of the vehicle outside-mirror units uses a lamp unit having a reflector, but even this type of lamp unit is the direct irradiating type lamp unit in which most of the light from the light source, such as LED, is irradiated directly from the lamp lens to the outside. Therefore, the vehicle outside-mirror unit including the conventional lamp unit has problems in view of appearance such that the LED as the light source makes a dot light emission, when the direct irradiating type lamp unit is turned on, and the light is glaring and dazzling hard light. Further, the vehicle outside-mirror unit including the conventional lamp unit has a problem in view of appearance such that when the direct irradiating type lamp unit is turned off, the light source such as LED itself is visible from the outside through the lamp lens.

SUMMARY OF THE INVENTION

It is an object of the present invention to solve at least the above problems in the conventional technology.

A vehicle outside-mirror unit according to one aspect of the present invention includes a mirror housing having a window; and a lamp unit included in the mirror housing. The lamp unit includes a lamp housing that divides a lamp chamber; a lamp lens; a light source that is fixed to the lamp lens in the lamp chamber; a shielding portion that shields the light source; a light transmitting portion that is provided at a position other than a position corresponding to the shielding portion of the lamp lens, and arranged at the window; and a reflection surface that is provided in the lamp housing in the lamp chamber, and reflects light from the light source to irradiate the light through the light transmitting portion to outside.

The other objects, features, and advantages of the present invention are specifically set forth in or will become apparent from the following detailed description of the invention when read in conjunction with the accompanying drawings.

DETAILED DESCRIPTION

Exemplary embodiments of a vehicle outside-mirror unit including a lamp unit according to the present invention will be explained in detail with reference to the accompanying drawings. Note that the invention is not limited thereto.

FIGS. 1 to 12 depict a first embodiment of a vehicle outside-mirror unit including a lamp unit according to the present invention. The configuration of the vehicle outside-mirror unit including the lamp unit in the first embodiment will be explained below. Reference sign "F" indicates a front side of a car C (traveling direction of the car C) throughout the various figures. Reference sign "B" indicates a back side of the car C. Reference sign "I" indicates the inside (center side) of the car C. Reference sign "O" indicates the outside (side) of the car C. Reference sign "U" indicates upward when the driver sees the front. Reference sign "D" indicates downward when the driver sees the front. Reference sign "L" indicates the left side when the driver sees the front. Reference sign "R" indicates the right side when the driver sees the front.

Reference sign 1 is a vehicle outside-mirror unit including the lamp unit in the first embodiment and is a door mirror for the vehicle in this embodiment, throughout the various figures. The door mirror 1 is respectively equipped on the left and the right doors of the car C.

Figure 4:
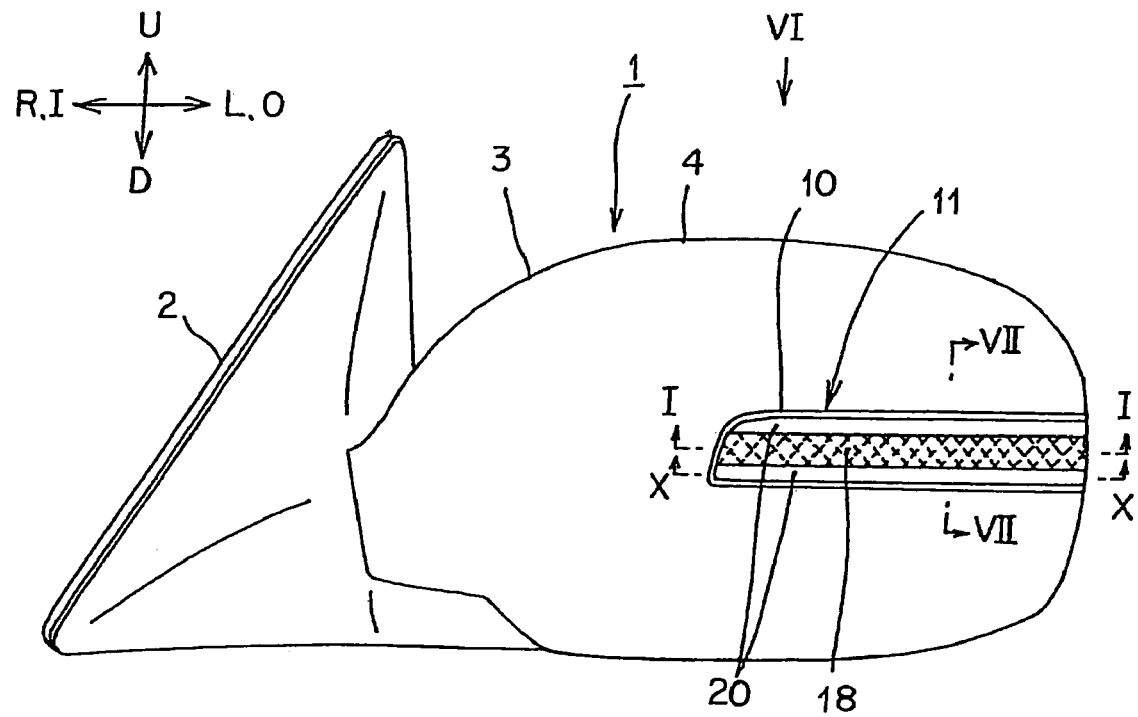
FIG. 4 is a front elevational view of the state when an LED is turned off and not emitting light.
Figure 5:
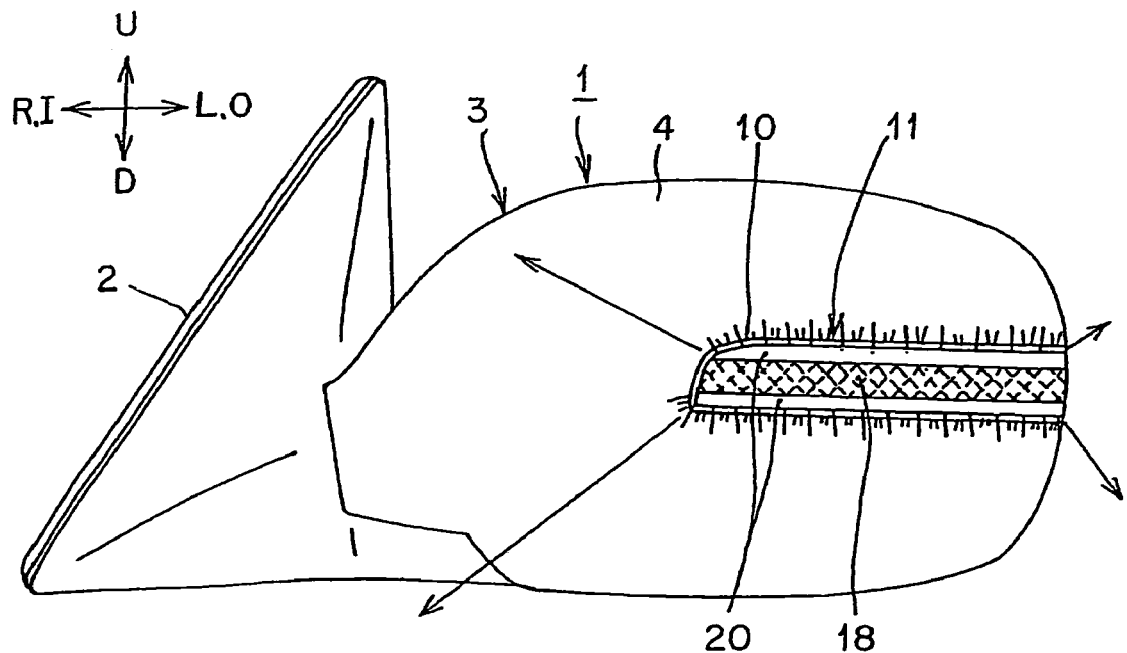
FIG. 5 is a front elevational view of the state when the LED is turned on and emitting light.
Figure 6:
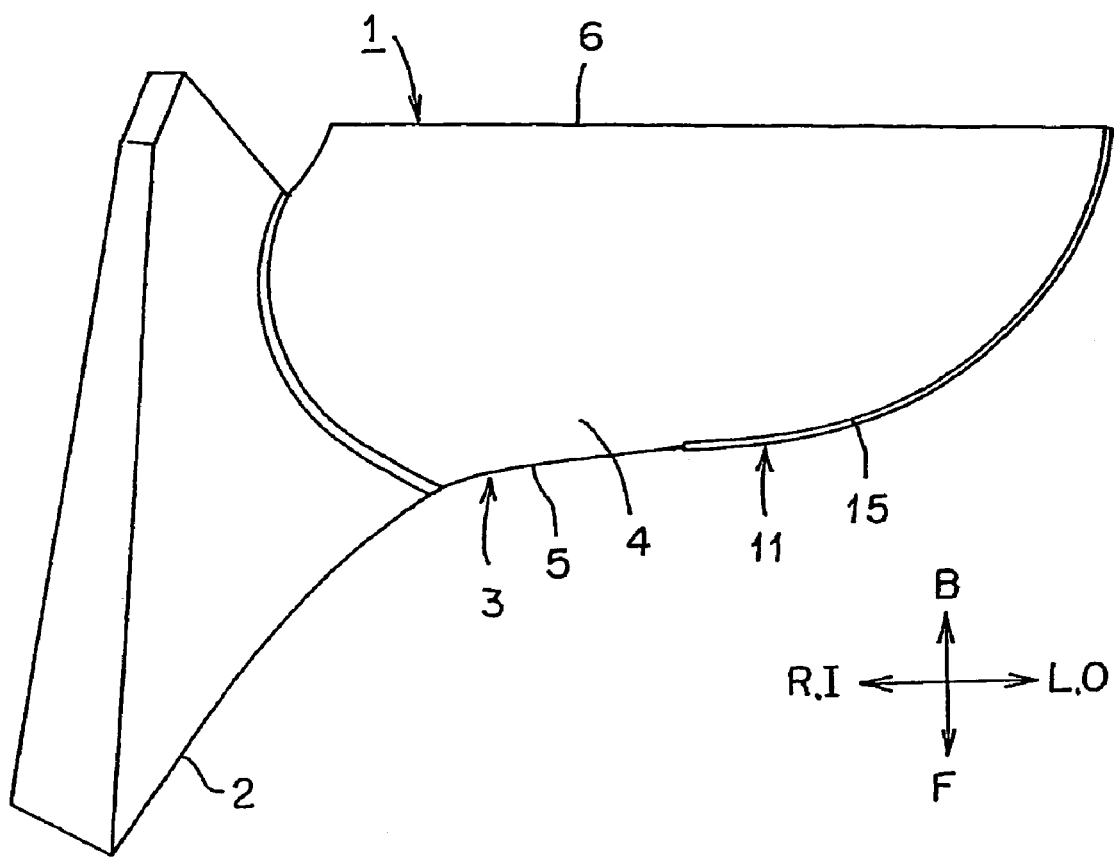
FIG. 6 is a plan view as seen from the direction of arrow III in FIG. 2.

The door mirror 1 includes, as shown in FIGS. 4 to 6, a base 2 secured on a door D, a shaft (not shown) provided on the base 2, and a mirror assembly 3 rotatably equipped on the shaft via an electric storing mechanism (not shown).

The mirror assembly 3 electrically rotates between a use position (position shown in FIGS. 2 and 3) and a backward stored position (not shown) with respect to the base 2 by the electric storing mechanism. The mirror assembly 3 rotates to the front side F and the back side B for buffering by a clutch action of the electric storage mechanism.

Figure 1:
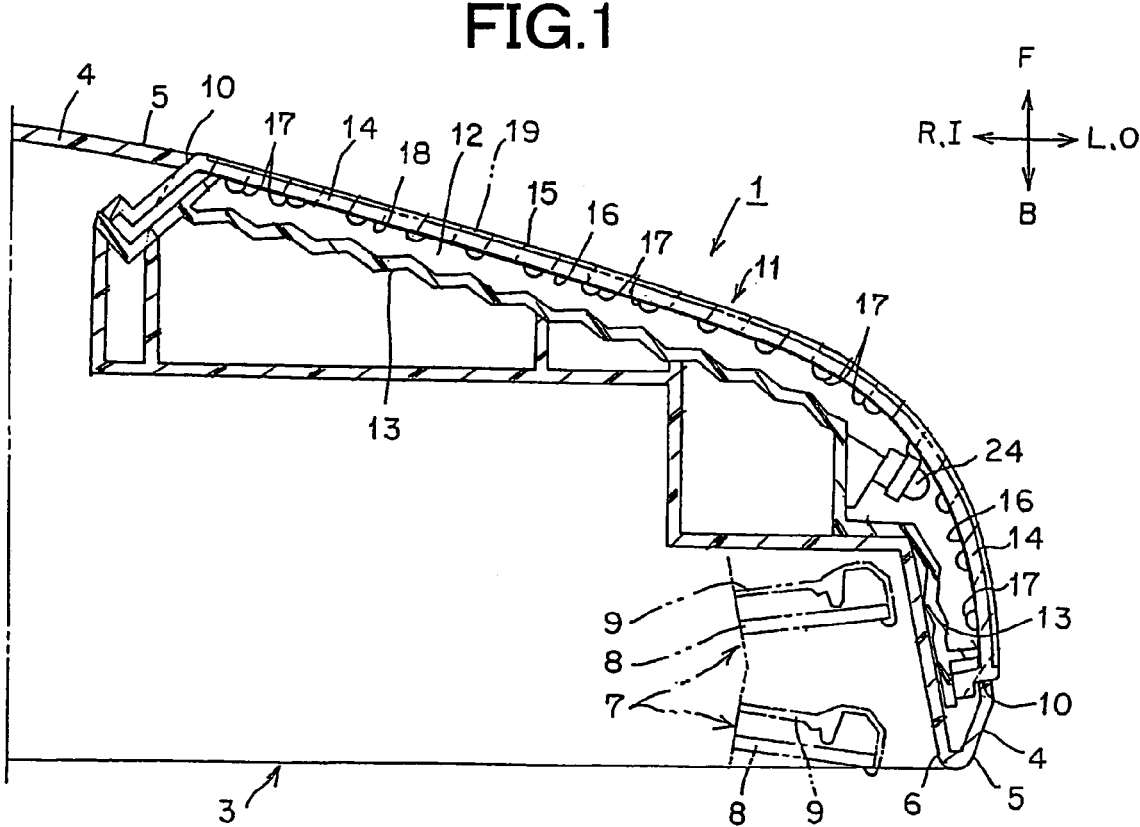
FIG. 1 is a cross section corresponding to a cross section along line I—I in FIG. 4, which depicts a first embodiment of a vehicle outside-mirror unit including a lamp unit according to the present invention.

The mirror assembly 3 has, as shown in FIG. 1, a mirror housing (or a mirror body or a mirror cover) 4. The mirror housing 4 is closed at a portion 5 from the front side F toward the outside O, and is opened at a portion 6 at the back side B.

A mirror unit 7 is equipped so as to be tiltable vertically and horizontally via a power unit (not shown) in the mirror housing 4. The mirror unit 7 has, as shown in FIG. 1, a mirror body 8 having a reflection surface, and a mirror holder 9 that holds the mirror body 8. The mirror holder 9 is fitted to the power unit. The reflection surface of the mirror body 8 is positioned so as to be tiltable vertically and horizontally at the opening 6 of the mirror housing 4. FIG. 1 depicts the state in which the mirror unit 7 shown by two-dot chain line is tilted to the left and the right.

As shown in FIGS. 1, 4, 5, and 7, a window 10 slenderized in the horizontal direction is provided, at a portion from about the middle in the horizontal direction to the outside O substantially at the center in the vertical direction of a closed portion 5 of the mirror housing. A lamp unit 11 (hereinafter, "lamp unit 11") is equipped in the mirror housing 4.

The lamp unit 11 is, as shown in FIGS. 4 and 5, slenderized in the longitudinal direction like the window 10. The lamp unit 11 has, as shown in FIGS. 1 and 7, a lamp housing 13 and a lamp lens 14 that divide a lamp chamber 12.

Figure 7:
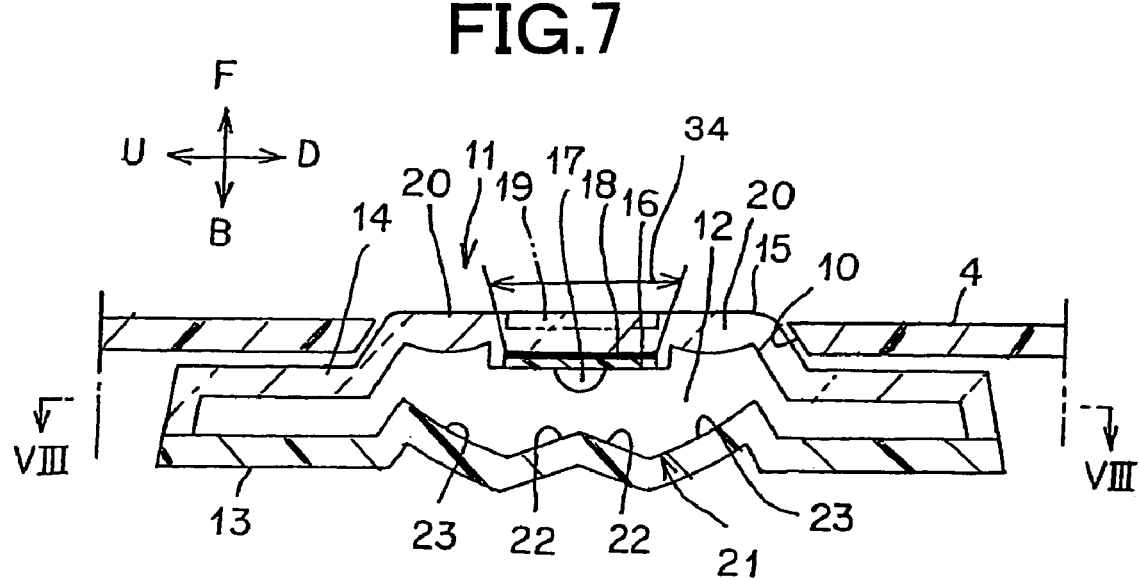
FIG. 7 is a cross section along line VII—VII in FIG. 4.

As shown in FIG. 7, a protrusion 15 is formed in the middle of the lamp lens 14 in the vertical direction. The protrusion 15 is arranged in the window 10. The shape of the protrusion 15 is, as shown in FIGS. 1, 6, and 7, along the shape of the mirror housing 4. As a result, the outer surface of the protrusion 15 and the outer surface of the mirror housing 4 become substantially flush.

As shown in FIGS. 1 and 7, the rear face of a belt-like flexible substrate 16 made of a glass epoxy resin or the like is secured on the inner face (a face opposite to the lamp chamber 12) of the protrusion 15, along the cross sectional shape of the lamp lens 14. A plurality of LEDs 17 as a light source is surface-mounted in an array on the surface of the flexible substrate 16 substantially at equal intervals. Surface mounting of the LED 17 is realized by bonding a chip of the LED 17 made of an epoxy resin or the like on the surface of the flexible substrate 16, covering the chip with a transparent resin lens, and securing the lens on the surface of the flexible substrate 16. The LED 17 is mainly for emitting ornamental light.

A light non-transmitting portion 18 as a shielding portion is provided at the position of the protrusion 15 where the flexible substrate 16 and the LED 17 are secured. The light non-transmitting portion 18 is obtained by applying aluminum plating, aluminum evaporation, silver plating, or the like. The light non-transmitting portion 18 is for concealing the LED 17 as the light source. The aluminum plating, aluminum evaporation, or silver plating applied to the light non-transmitting portion 18 is indicated by thick solid line in FIG. 7, together with a range 34 indicated by arrow in FIG. 7 and the flexible substrate 16 in FIG. 9, and is provided in the range 34 indicated by arrow in FIG. 9. An ornamental prism group 19 is provided at a position corresponding to the light non-transmitting portion 18 of the outer surface of the protrusion 15. The prism group 19 is indicated by dot chain line in the figure. The light non-transmitting portion 18 and the prism group 19 are slenderized in the horizontal direction, substantially in the middle in the vertical direction of the protrusion 15, which is slenderized in the horizontal direction.

On the other hand, a light transmitting portion 20 is provided at positions in the protrusion 15, other than the positions where the flexible substrate 16, the LED 17, the light non-transmitting portion light 18, and the prism group 19 are provided. Ornamentation is applied to the light transmitting portion 20. The ornamentation for the light transmitting portion 20 includes, for example, an ornamental color such as the color of the light-transmitting lamp lens 14, ornamental smoking (semitransparent color), an ornamental horning, and the like. The ornamental color for the light transmitting portion 20, ornamental smoking, the ornamental horning, or the like is provided in the range other than the light non-transmitting portion 18, and in a range 35 indicated by arrow in FIG. 10. The ornamental smoking for the light transmitting portion 20, the ornamental horning, and the like are applied, for example, after masking the portion corresponding to the light non-transmitting portion 18. The light transmitting portion 20 is slenderized in the horizontal direction above and below the light non-transmitting portion 18 and the prism group 19 in the protrusion 15 of the lamp lens 14, which is slenderized in the horizontal direction.

Figure 8:
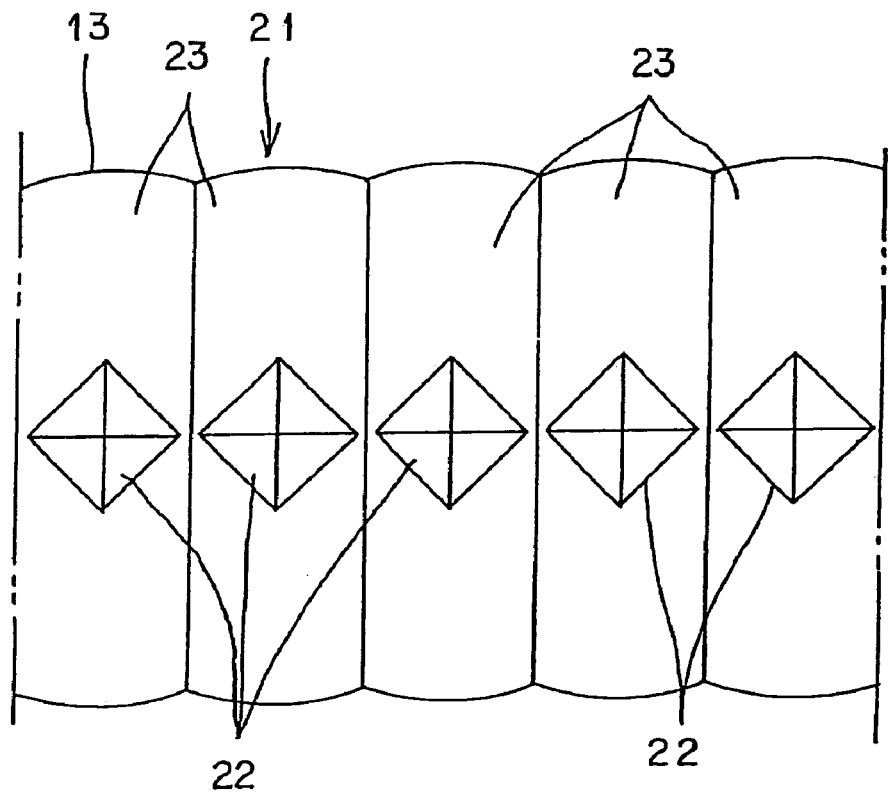
FIG. 8 is a view in the direction of arrow VIII—VIII in FIG. 7.
Figure 9:
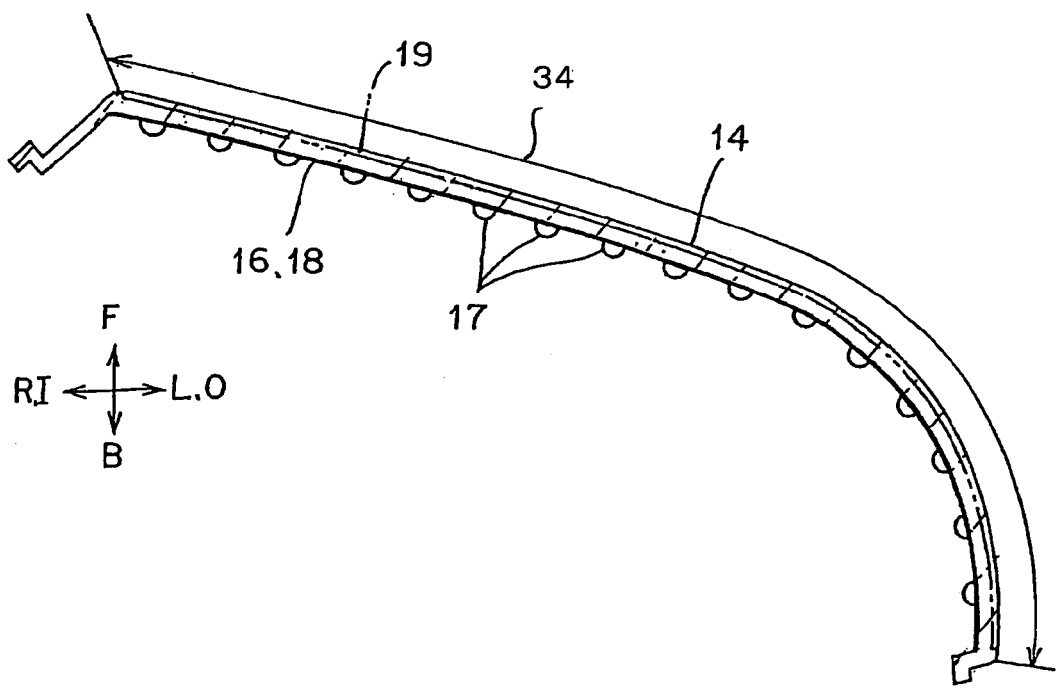
FIG. 9 is a cross section corresponding to a cross section along line I—I in FIG. 4, which depicts a range in which a light non-transmitting portion is provided by applying aluminum plating, aluminum evaporation, or silver plating.

As shown in FIG. 7, a reflection surface 21 is provided on the inner surface (a surface opposite to the lamp chamber 12) of the lamp housing 13 in the vertically middle portion. The reflection surface 21 is for reflecting the light from the LED 17 and irradiating the light to the outside. The reflection surface 21 is set, as shown in FIG. 1, corresponding to each LED 17. The reflection surface 21 is formed of, as shown in FIGS. 1, 7, and 8, a flat reflection surface 22 in a pyramid shape (square quadrangular pyramid shape) and a curved reflection surface 23 of a paraboloid of revolution, with the emission point of the LED being a substantial focal point.

Figure 10:
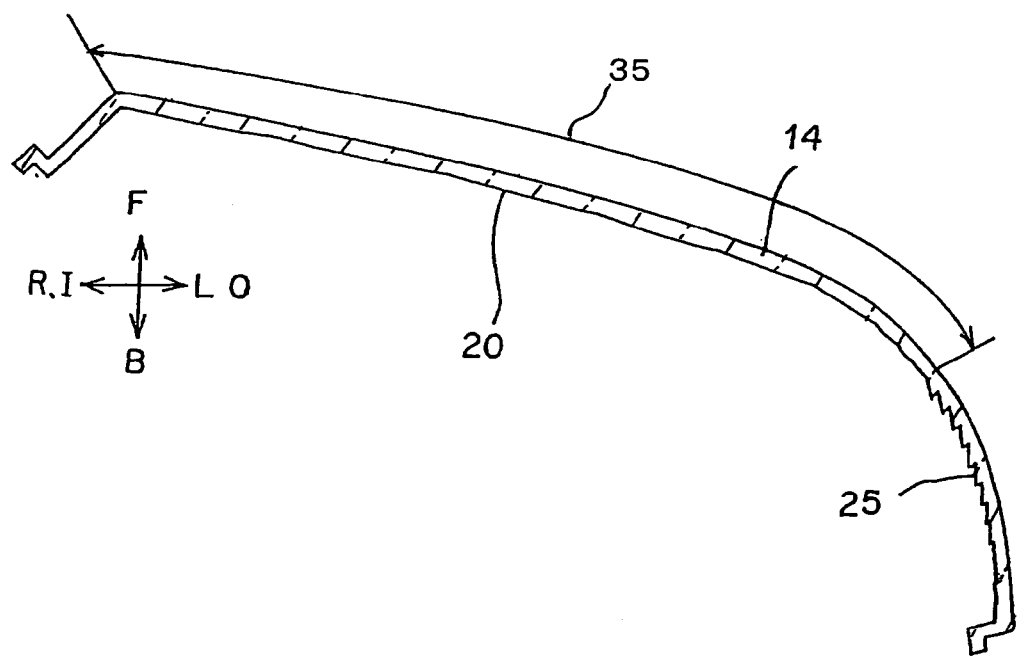
FIG. 10 is a cross section corresponding to a cross section along line X—X in FIG. 4, which depicts a range in which a light transmitting portion is provided by applying smoking processing.
Figure 11:
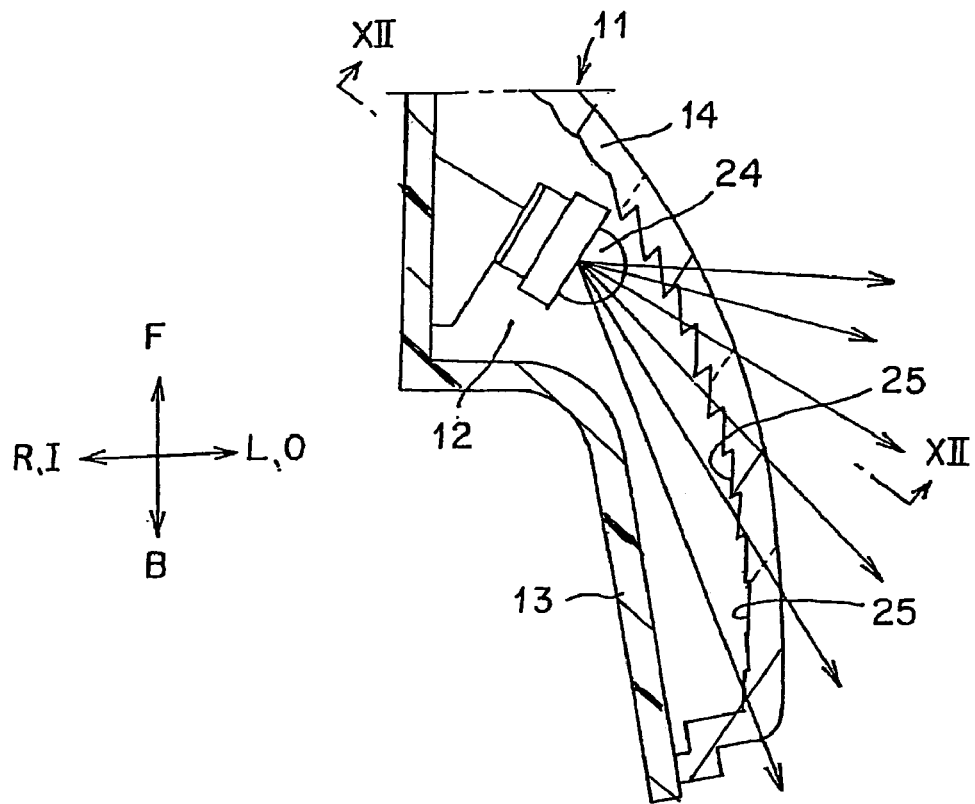
FIG. 11 is a partial cross section depicting near the LED of the turn lamp function.
Figure 12:
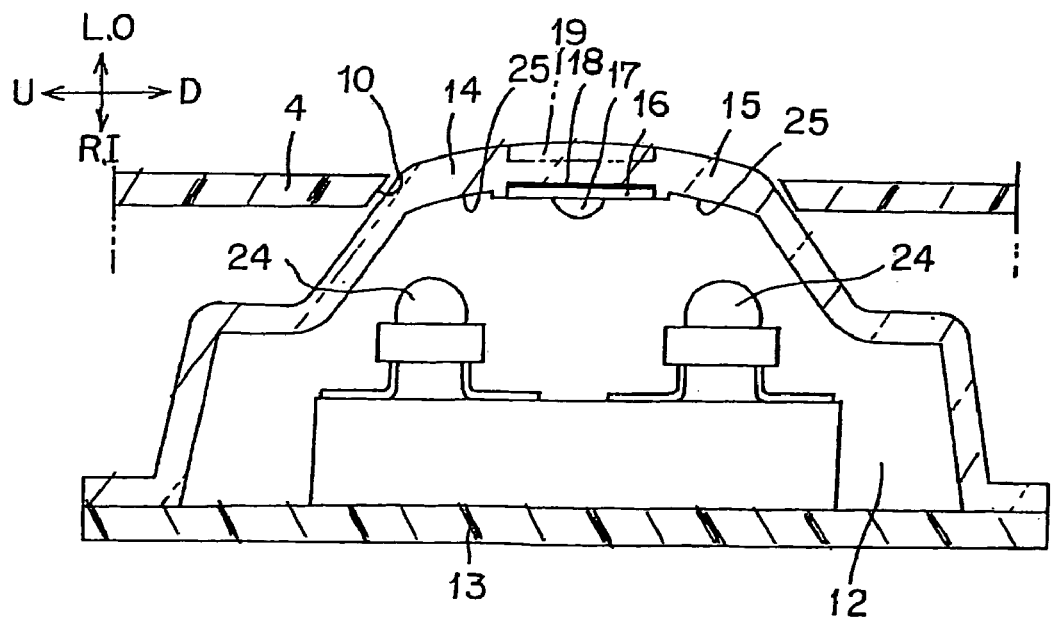
FIG. 12 is a cross section along line XII—XII in FIG. 11.
Figure 13:
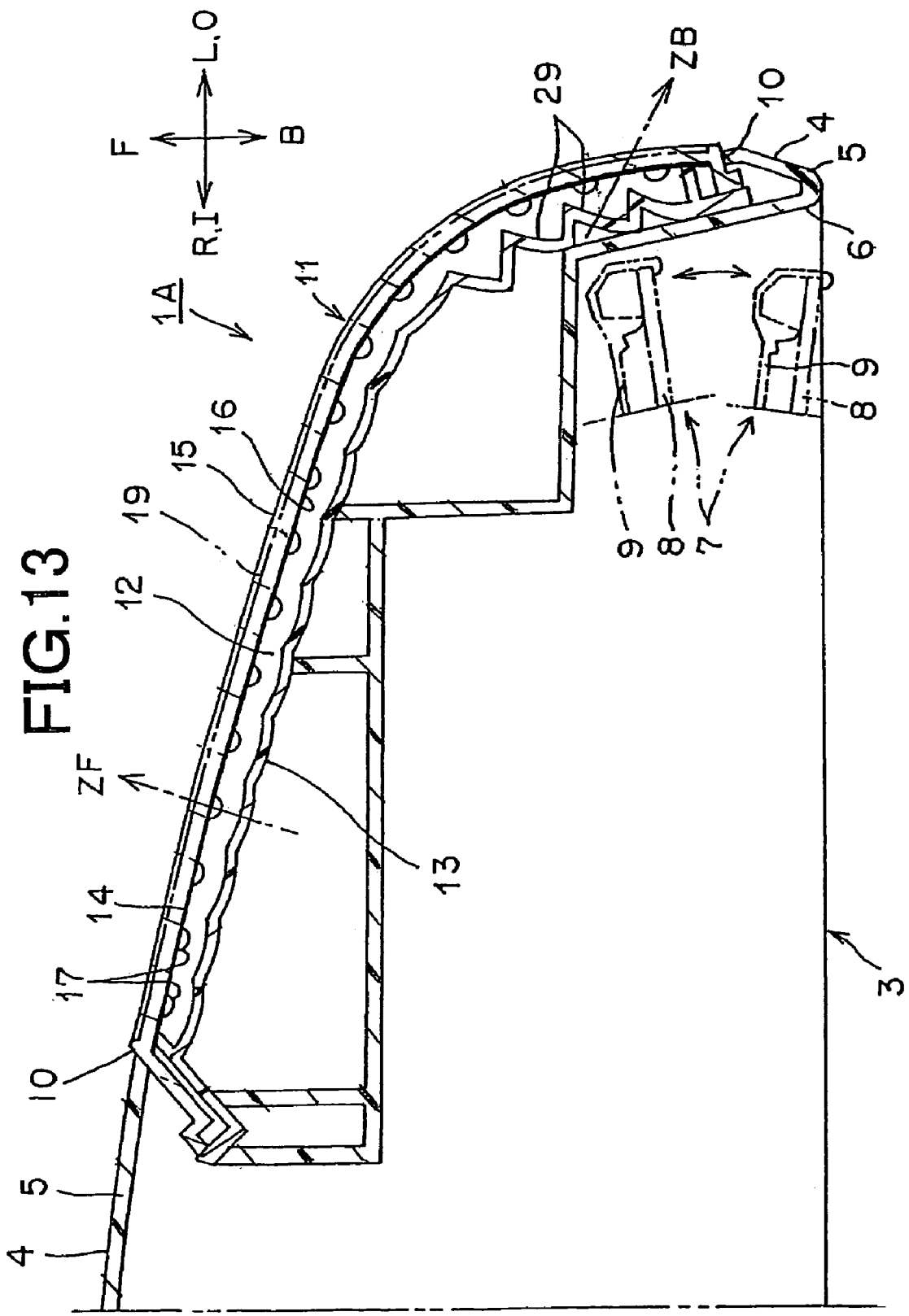
FIG. 13 is a cross section corresponding to a cross section along line I—I in FIG. 4, which depicts a second embodiment of the vehicle outside-mirror unit including the lamp unit according to the present invention.
Figure 14:
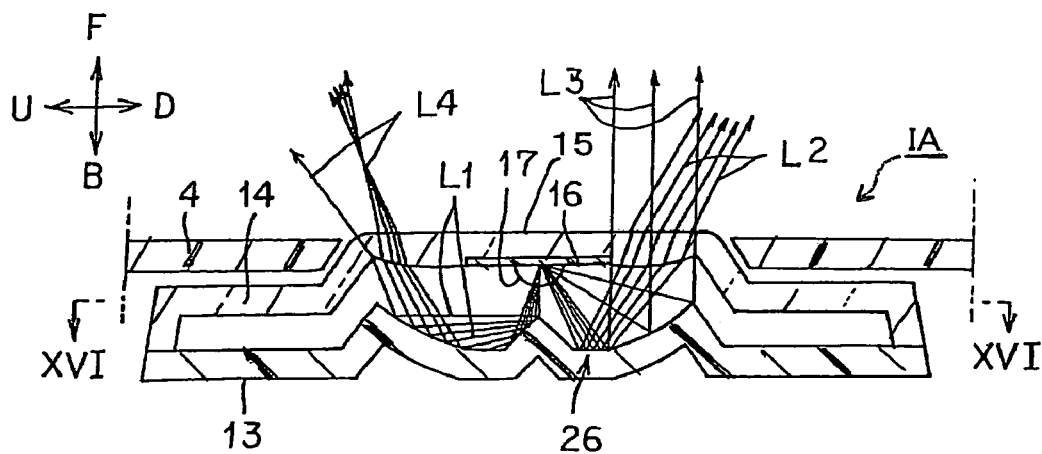
FIG. 14 is a cross section corresponding to a cross section along line VII—VII in FIG. 4 and to a cross section along line XIV—XIV in FIG. 16.
Figure 15:
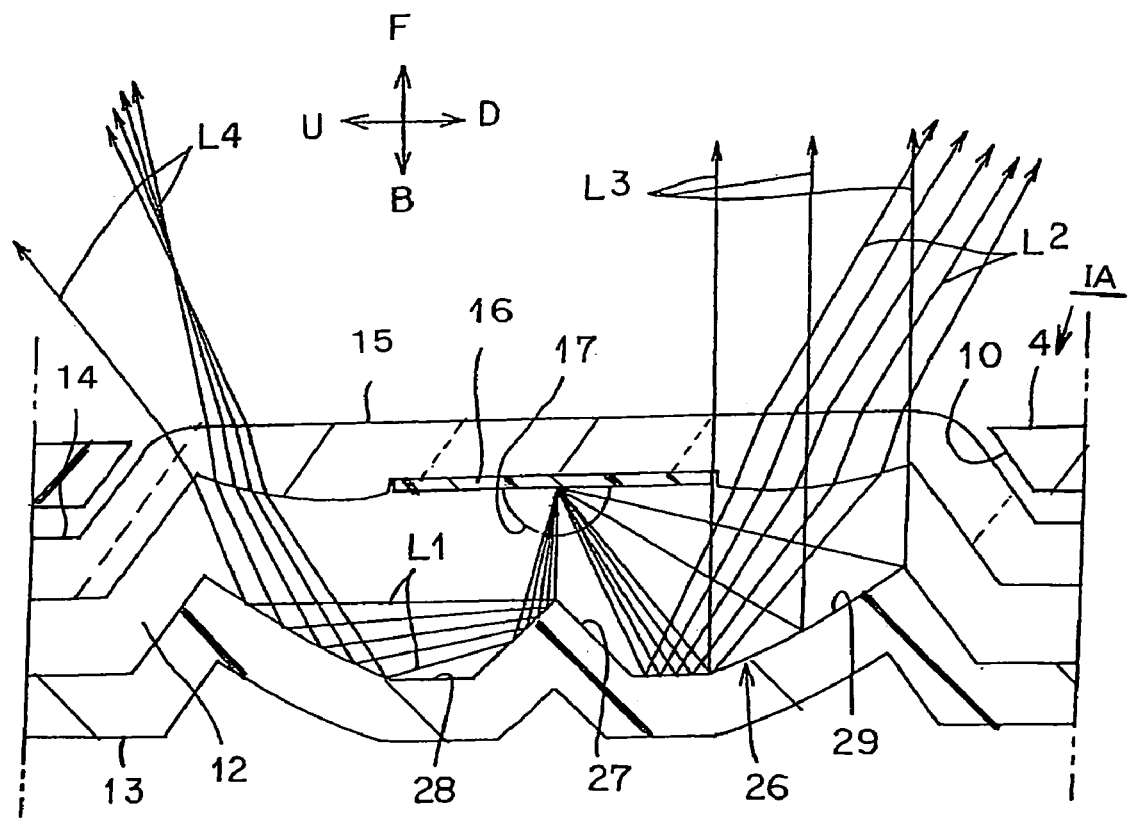
FIG. 15 is an enlarged cross section depicting an optical path from the LED.
Figure 16:
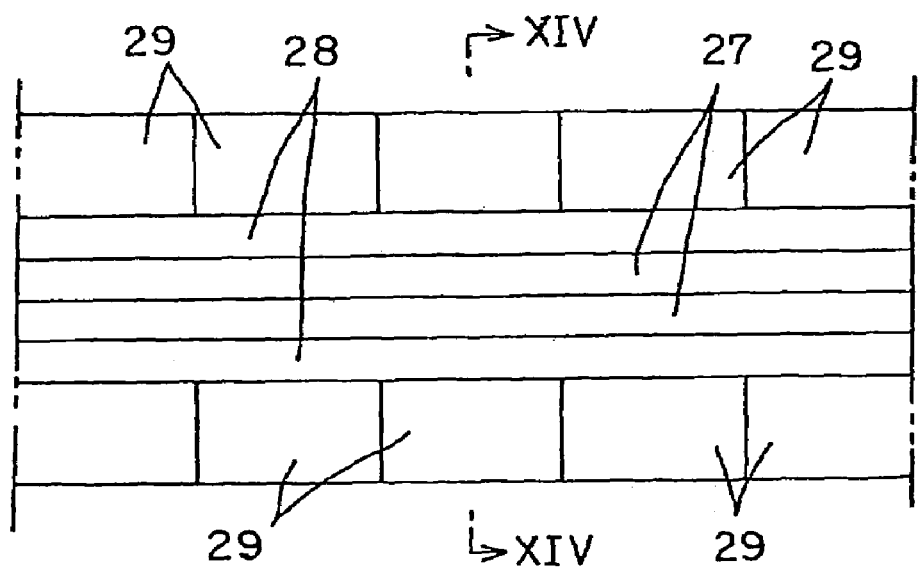
FIG. 16 is a view in the direction of arrow XVI—XVI in FIG. 14.

Two LEDs 24 are provided in the lamp unit 11 for the turn lamp function. The LED 24 is arranged, as shown in FIGS. 11 and 12, in a lamp chamber 12, at a wrap-around portion from the front side F to the outside O. On the other hand, a prism 25 that controls the light distribution of the light from the LED 24 (indicated by arrow of solid line in FIG. 11) is provided at a portion on the outside O of the lamp lens 14. As shown in FIG. 10, the ornamental smoking, the ornamental horning, or the like for the light transmitting portion 20 is not applied to a portion of the lamp lens 14 where the prism 25 for controlling the light distribution is provided.

Thus, the lamp unit 11 has a unit structure including the lamp housing 13, the lamp lens 14, the LEDs 17, the light non-transmitting portions 18, the light transmitting portions 20, the reflection surfaces 21, and the LEDs 24.

The action of the vehicle outside-mirror unit (door mirror 1) including the lamp unit in the first embodiment will be explained below.

When the LEDs 17 and 24 are turned off and does not emit light, these look like as shown in FIG. 4. At this time, the light non-transmitting portion 18 applied with the prism group 19 looks like emitting light, and the light transmitting portion 20 applied with the ornamental smoking or the like looks like not emitting light. Further, the LEDs 17 and 24 are concealed by the light transmitting portion 20 and are not visible.

The LEDs 17 are turned on so as to emit light. The light from the LEDs 17 is reflected by the flat reflection surfaces 22 and the curved reflection surfaces 23 of the reflection surface 21. The reflected light cannot transmit through the light non-transmitting portion 18, and hence, the light non-transmitting portion 18 dose not emit light. On the other hand, the reflected light transmits through the light transmitting portion 20, and hence, the light transmitting portion 20 emits light over the whole surface, and looks like as shown in FIG. 5. That is, the two up and down rays of light of the ornament light slenderized in the horizontal direction are not visible. Further, the light from the LED 17 is once reflected by the flat reflection surface 22 and the curved reflection surface 23 of the reflection surface 21 and indirectly irradiated to the outside. In FIG. 5, a plurality of short straight lines drawn in the vertical direction from the up and down horizontal line of the lamp unit 11 indicate the state such that the light transmitting portion 20 is emitting light over the whole surface.

The LEDs 24 are also turned on so as to emit light. Then the light from the LEDs 24 transmits through the prism 25 for controlling the light distribution of the lamp lens 14, as shown by arrow of solid line in FIG. 11, and the light distribution thereof is controlled within a predetermined range and irradiated to the outside. The range of the light irradiated from the LEDs 24 is the hatched area shown in FIGS. 2 and 3. θ1 is 60 degrees, θ2 is 5 degrees with respect to the vertical axis V—V in the traveling direction of the car C, and θ3 is 15 degrees with respect to the horizontal axis H—H of the car C in FIG. 3.

Figure 2:
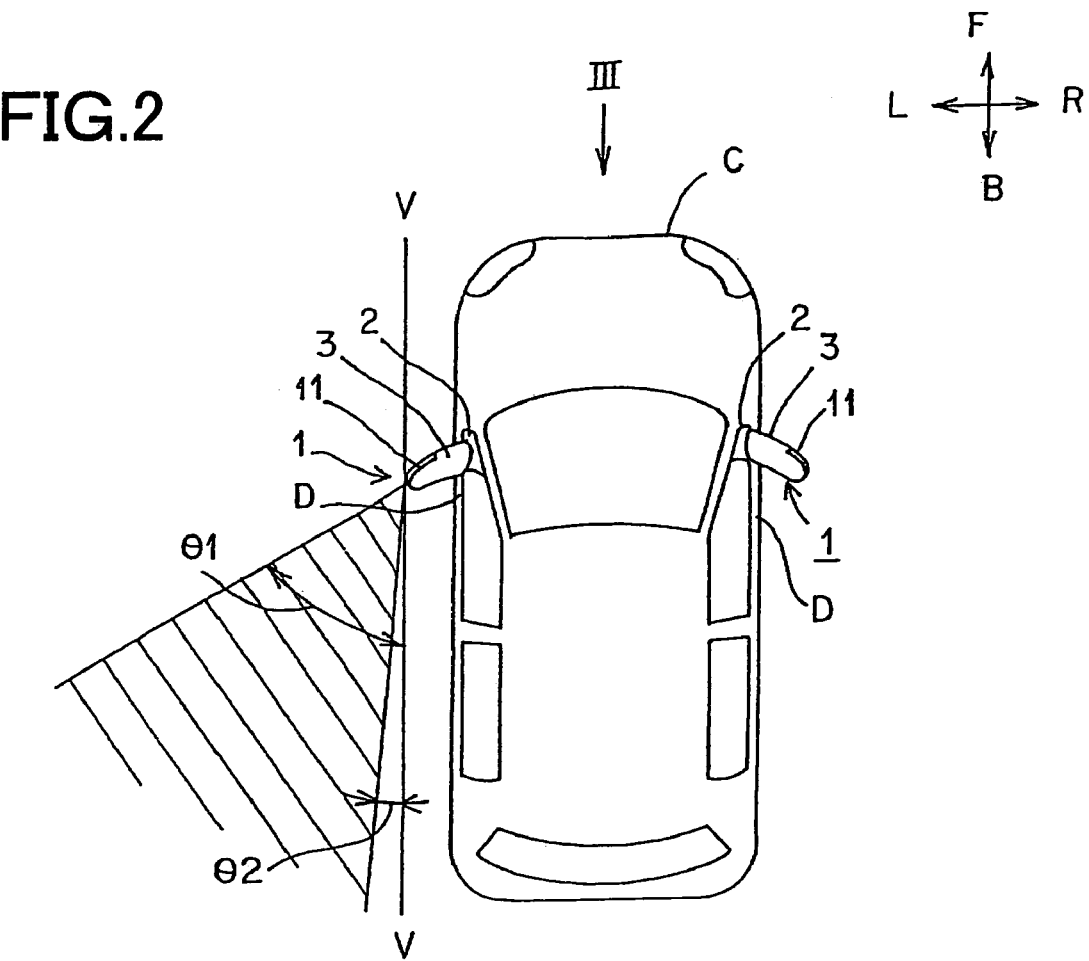
FIG. 2 is a plan view of a light distribution range of a turn lamp function in the state of being equipped on a vehicle.
Figure 3:
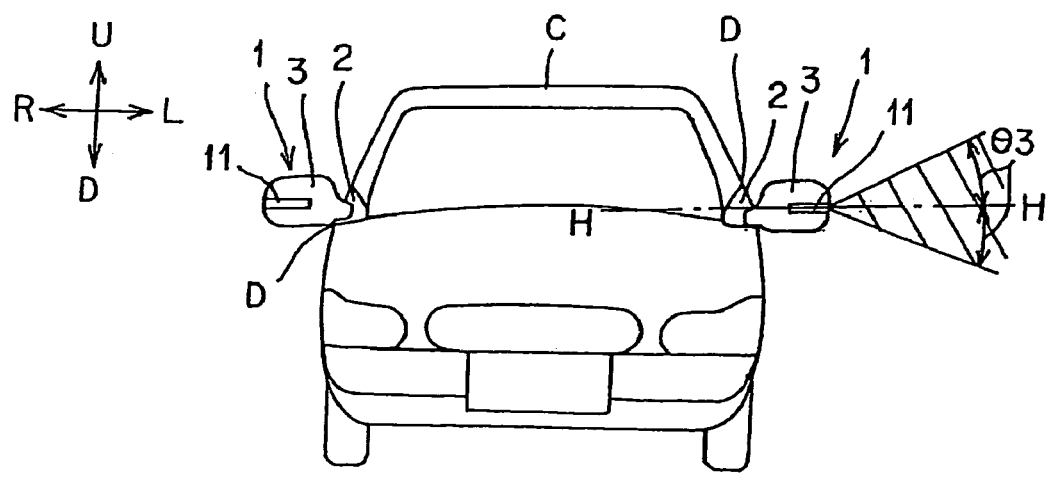
FIG. 3 is a front elevational view for explaining the light distribution range of the turn lamp function, and is a view in the direction of arrow III in FIG. 2.

As a result, the ornamental light by the LEDs 17 and the turn lamp function by the LEDs 24 can be obtained for the door mirror 1. In FIGS. 2 and 3, the light distribution range by the door mirror 1 equipped on the door D on the left side F of the car C has been explained, but the same light distribution range can be obtained for the door mirror 1 equipped on the door D on the right side R of the car C.

For the LEDs 17 and 24 in the door mirror 1, an LED other than the LEDs that emit red light, for example, an LED that emits yellow, amber, or white light is used. When the LED that emits white light is used, a colored lens of a color other than red, for example, a colored lens of yellow or amber is used for the lamp lens 14.

The effect of the vehicle outside-mirror unit (door mirror 1) including the lamp unit in the embodiment will be explained below.

The door mirror 1 uses the lamp unit 11 that once reflects the light from the LEDs 17 by the flat reflection surfaces 22 and the curved reflection surfaces 23 of the reflection surface 21, and indirectly irradiates the reflected light from the light transmitting portion 20 of the lamp lens 14 to the outside. With the indirectly irradiating type lamp unit 11, the light transmitting portion 20 of the lamp lens 14 emits light substantially over the whole surface and soft light can be obtained, as compared to the lamp unit of a directly irradiating type used for the conventional vehicle outside-mirror unit. As a result, the door mirror 1 can improve the appearance when the LEDs 17 is turned on.

With the door mirror 1, since the light from the LEDs 17 fixed to the light non-transmitting portion 18 of the lamp lens 14 is reflected by the reflection surface 21 provided in the lamp housing 13 opposite to the lamp lens 14 and irradiated from the light transmitting portion 20 of the lamp lens 14 to the outside, the light from the LEDs 17 can be indirectly irradiated to the outside reliably.

Further, in the door mirror 1, the position of the lamp lens 14 where the LED 17 is secured is in the light non-transmitting portion 18, even if the inside of the lamp chamber 12 is visible from outside through the lamp lens 14, the flexible substrate 16 and the LEDs 17 are concealed by the light non-transmitting portion 18 and are not visible. As a result, the door mirror 1 can improve the appearance when the LEDs 17 is turned off.

Particularly, in the door mirror 1 in the first embodiment, the light non-transmitting portion 18 and the light transmitting portion 20 are provided on the lamp lens 14, the prism group 19 is provided on the light non-transmitting portion 18, and ornamental smoking or the like is applied to the light transmitting portion 20. Therefore, in the door mirror 1, when the LEDs 17 are turned off and does not emit light, the light non-transmitting portion 18 provided with the prism group 19 looks like shining, and the light transmitting portion 20 provided with ornamentation such as smoking looks like not shining. Actually, however, the light non-transmitting portion 18 of the prism group 19 that is considered to be shining does not shine, and the light transmitting portion 20, such as the ornamental smoking, which is considered not to shine, shines at the time of turning on the LED 17 so as to emit light. As a result, the door mirror 1 can improve the design effect of the lamp unit of the vehicle outside-mirror unit, by the unexpectedness between the expectation of irradiation by the light non-transmitting portion 18 in the lamp lens 14 when the LEDs 17 is turned off and not emitting light, and the actual irradiation by the light transmitting portion 20 in the lamp lens 14 when the LEDs 17 is turned on and emitting light.

In the door mirror 1, since the ornamental prism group 19 is provided on the light non-transmitting portion 18, and ornamental smoking is applied to the light transmitting portion 20, the design effect due to the unexpectedness is large. In the present invention, the ornamental prism group 19 and ornamental smoking may not be provided on the light non-transmitting portion 18 and the light transmitting portion 20.

In the door mirror 1, since the lamp unit has a unit structure as the lamp unit 11, if the window 10 is formed in the mirror housing 4, the lamp unit 11 can be applied to an existing vehicle outside-mirror unit. Further, since the lamp unit can be applied to various vehicle outside-mirror units having a shape of the mirror housing approximate or similar to the one in the present invention. As a result, versatility and common feature can be obtained for the lamp unit 11.

In the door mirror 1, since the LEDs 17 are surface-mounted on the flexible substrate 16 fixed to the lamp lens 14, the lamp unit 11 can be made thin. As a result, the door mirror 1 is suitable for the vehicle outside-mirror unit having a limited space for installing the lamp unit, and the lamp unit 11 can follow the outer shape of the mirror housing 4 without protruding from the mirror housing 4. Further, the LEDs 17 can be arranged along the outside surface of the lamp lens 14 by the flexible substrate 16.

In the door mirror 1, further, the complex reflection surface 21 including the flat reflection surfaces 22 and the curved reflection surfaces 23 is provided corresponding to each of the LEDs 17. Therefore, the light from the LEDs 17 can be effectively reflected, and wide light emission can be obtained in the light transmitting portion 20.

Since the door mirror 1 is provided with the LEDs 24 for the turn lamp function, the door mirror 1 can also have the turn lamp function. Here, it is desired to arrange the lamp unit in the wrap-around portion of the door mirror 1 from the front side F to the outside O, in order to illuminate the range satisfying the turn lamp function (the hatched areas in FIGS. 2 and 3). As shown in FIG. 1, however, the mirror unit 7 is tiltable in the door mirror 1. Therefore, it is necessary to arrange the lighting unit (LEDs 24 and the like) in the state protruding from the wrap-around portion toward the outside O, so as not to interrupt tilting of the mirror unit 7. In this case, the lighting unit protrudes from the outer surface (design) of the door mirror 1 (mirror housing 4), which is not desirable in view of appearance. On the other hand, in the door mirror 1, since the prism 25 for controlling the light distribution is provided on the lamp lens 14, the LEDs 24 can be arranged at a position on the front side F, in the wrap-around portion of the mirror housing 4, so as not to interrupt tilting of the mirror unit 7, and the lamp lens 14 can follow the shape of the outer surface (design) of the mirror housing 4. At the same time, the door mirror 1 can sufficiently satisfy the light distribution range for the turn lamp function.

FIGS. 13 to 16 depict a second embodiment of the vehicle outside-mirror unit having the lamp unit according to the present invention. Like reference signs as in FIGS. 1 to 12 designate like parts throughout FIGS. 13 to 16.

In a door mirror 1A in the second embodiment, the LEDs 24 for the turn lamp function are eliminated with respect to the door mirror 1 in the first embodiment, and the structure of a reflection surface 26 is changed. The reflection surface 26 includes an inverted V-shape flat reflection surface 27 and a V-shape flat reflection surface 28 provided along the row of a plurality of LEDs 17, and a curved reflection surface 29 of a paraboloid of revolution, with the emission point of the LED 17 being a substantial focal point.

The inverted V-shape flat reflection surface 27 reflects light from the LED 17 toward the curved reflection surface 29 as reflected light L1. The V-shape flat reflection surface 28 reflects light from the LED 17 outward as reflected light L2. The curved reflection surface 29 reflects light from the LED 17 outward as reflected light L3 of parallel light, and reflects light from the inverted V-shape flat reflection surface 27 outward as reflected light L4.

The door mirror 1A in the second embodiment can achieve the similar action and effect to those of the door mirror 1 in the first embodiment. Further, the door mirror 1A can use the light from the LED 17 effectively, by composite reflection of the reflected light L1 from the inverted V-shape flat reflection surface 27, the reflected light L2 from the V-shape flat reflection surface 28, and the reflected light L3 and L4 from the curved reflection surface 29.

In the door mirror 1A in the second embodiment, since the LEDs 24 for the turn lamp function are eliminated, the optical axis ZB of the curved reflection surface 29 corresponding to the back side B of the wrap-around portion of the mirror housing 4 is directed toward the back side B with respect to the optical axis ZF of another curved reflection surface 29 corresponding to the front side F of the mirror housing 4. As a result, the ornamental LEDs 17 can achieve the turn lamp function.

Figure 17:
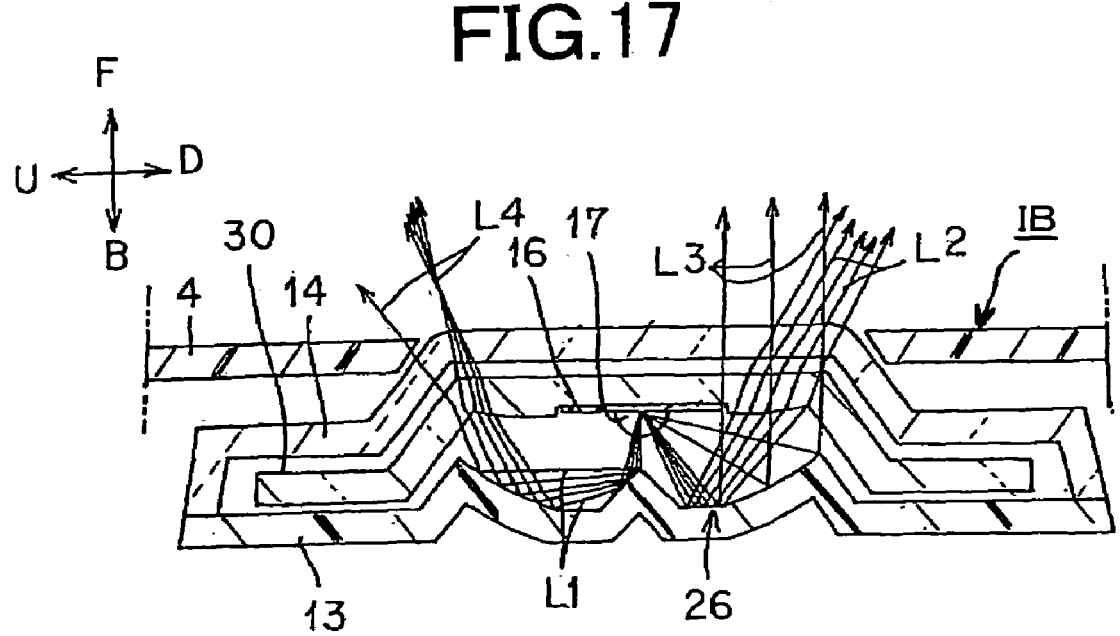
FIG. 17 is a cross section corresponding to a cross section along line VII—VII in FIG. 4, and also corresponding to a cross section along line XIV—XIV in FIG. 16, which depicts a modification of the second embodiment of the vehicle outside-mirror unit including the lamp unit according to the present invention.

FIG. 17 depicts a modification of the second embodiment. Like reference signs as in FIGS. 1 to 16 designate like parts in the figure. In a door mirror 1B in the modification of the second embodiment, an inner lens 30 is arranged in the lamp chamber 12, with respect to the door mirror 1A in the second embodiment, and the LED 17 is fixed to the inner lens 30 via the flexible substrate 16. The door mirror 1B can achieve the action and effect substantially similar to those of the door mirrors 1 and 1A in the first and the second embodiments. Further, due to the action of the double lens by the inner lens 30 and the outer lens (lamp lens 14), the visible color of the outer lens at the time of turning off the LED 17 and the visible color of the outer lens at the time of turning on the LED 17 can be changed.

Figure 18:
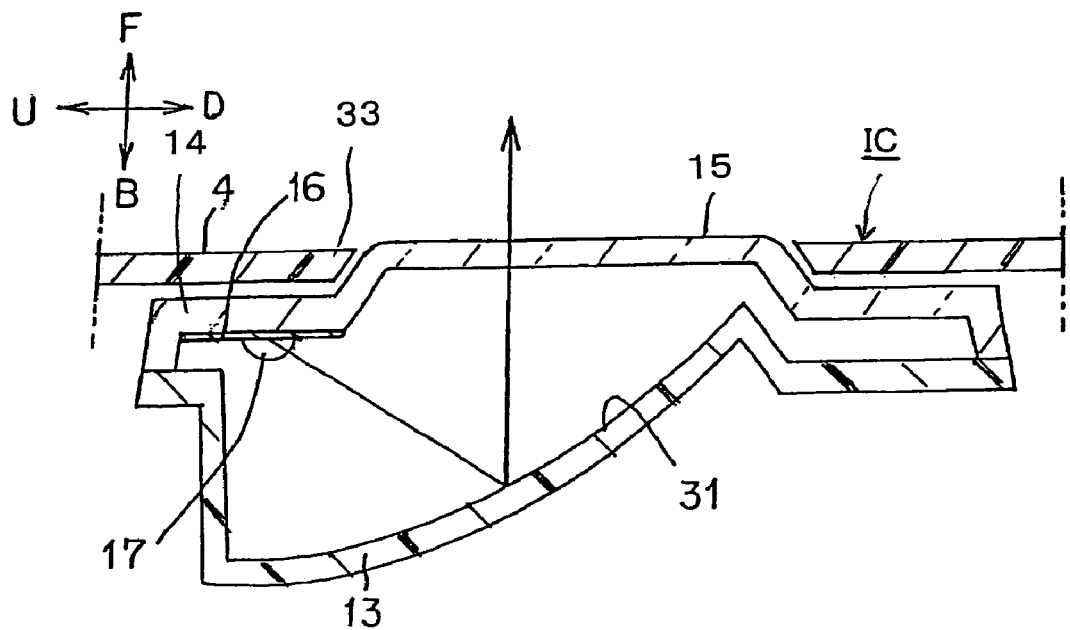
FIG. 18 is a cross section corresponding to a cross section along line VII—VII in FIG. 4, which depicts a third embodiment of the vehicle outside-mirror unit including the lamp unit according to the present invention.

FIG. 18 depicts a third embodiment of the vehicle outside-mirror unit including the lamp unit according to the present invention. Like reference signs as in FIGS. 1 to 17 designate like parts in the figure.

In a door mirror 1C in the third embodiment, the LED 17 is fixed to the upper part (or the lower part) of a protrusion 15 of the lamp lens 14 via the flexible substrate 16, with respect to the door mirrors 1, 1A, and 1B in the first and the second embodiments and the modification. On the other hand, a curved reflection surface 31, for example, on one side of the paraboloid of revolution, is provided in the lamp housing 13 corresponding to each of the LEDs 17. A shielding portion 33 for concealing the LED 17 is provided at an edge of the window 10 in the mirror housing 4, and at a position of the lamp lens 14 corresponding to a position where the LED 17 is fixed.

The door mirror 1C in the third embodiment can achieve the action and effect similar to those of the door mirrors 1, 1A, and 1B in the first and the second embodiments and the modification. In the door mirror 1C, since the flexible substrate 16 and the LED 17 are concealed by the shielding portion 33, the presence of the flexible substrate 16 and the LED 17 can be concealed without providing the light non-transmitting portion applied with the aluminum plating, aluminum evaporation, or silver plating, on the lamp lens 14.

Figure 19:
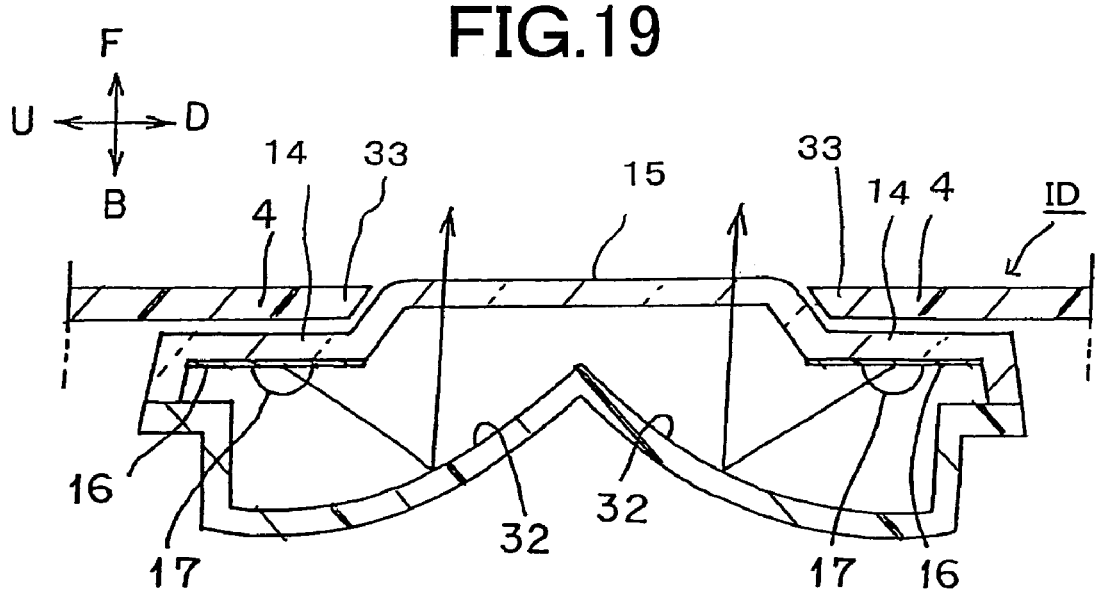
FIG. 19 is a cross section corresponding to a cross section along line VII—VII in FIG. 4, which depicts a fourth embodiment of the vehicle outside-mirror unit including the lamp unit according to the present invention.

FIG. 19 depicts a fourth embodiment of the vehicle outside-mirror unit including the lamp unit according to the present invention. Like reference signs as in FIGS. 1 to 18 designate like parts in the figure.

In a door mirror 1D in the fourth embodiment, the LED 17 is fixed to both the upper part and the lower part of the protrusion 15 of the lamp lens 14 via the flexible substrate 16, with respect to the door mirrors 1, 1A, 1B, and 1C in the first, the second, and the third embodiments and the modification. On the other hand, curved reflection surfaces 32, for example, on both sides of the paraboloid of revolution, are provided in the lamp housing 13 corresponding to each of the LEDs 17. The shielding portion 33 for concealing the LED 17 is provided at an edge of the window 10 of the mirror housing 4, and at a portion of the lamp lens 14 corresponding to a portion where the LED 17 is fixed.

The door mirror 1D in the fourth embodiment can achieve the action and effect similar to those of the door mirrors 1, 1A, 1B, and 1C in the first, the second, and the third embodiments and the modification. In the door mirror 1D, since the flexible substrate 16 and the LED 17 are concealed by the shielding portion 33, the presence of the flexible substrate 16 and the LED 17 can be concealed without providing the light non-transmitting portion applied with the aluminum plating, aluminum evaporation, or silver plating on the lamp lens 14.

In the first, the second, the third, and the fourth embodiments and the modification, the door mirror has been explained. In the present invention, however, the mirror may not be the door mirror, and may be other vehicle outside-mirror units, for example, a fender mirror, a truck mirror, or the like.

In the first, the second, the third, and the fourth embodiments and the modification, the mirror housing and the lamp housing 13 in the lamp unit 11 having the unit structure are formed of separate bodies. In the present invention, however, the lamp unit 11 may not have the unit structure, and the mirror housing may also function as the lamp housing. In this case, in the portion of the mirror housing, which serves as the lamp housing, the lamp lens and the lamp chamber are separated as in the lamp housing, and a reflection surface for reflecting the light from the light source fixed to the lamp lens is provided therein.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A vehicle outside-mirror unit comprising:
   a mirror housing having a window; and
   a lamp unit included in the mirror housing, wherein the lamp unit includes
      a lamp housing that divides a lamp chamber;
      a lamp lens;
      a light source that is fixed to the lamp lens in the lamp chamber;
      a shielding portion that shields the light source;
      a light transmitting portion that is provided at a position other than a position corresponding to the shielding portion of the lamp lens, and arranged at the window; and
      a reflection surface that is provided in the lamp housing in the lamp chamber, and reflects light from the light source to irradiate the light through the light transmitting portion to outside.

2. The vehicle outside-mirror unit according to claim 1, wherein the shielding portion is a light non-transmitting portion arranged at the window together with the light transmitting portion, and provided at a position of the lamp lens where the light source is fixed.

3. The vehicle outside-mirror unit according to claim 1, wherein
   the shielding portion is a light non-transmitting portion arranged at the window together with the light transmitting portion, and provided at a position of the lamp lens where the light source is fixed,
   on the light non-transmitting portion, an ornamental prism group is provided, and
   on the light transmitting portion, an ornamental color, ornamental smoking, and an ornamental horning, are provided.

4. The vehicle outside-mirror unit according to claim 1, wherein the lamp unit has a unit structure.

5. The vehicle outside-mirror unit according to claim 1, wherein
   the light source is formed of a plurality of light emitting diodes surface-mounted on a flexible substrate, and
   the flexible substrate is fixed to the lamp lens.

6. The vehicle outside-mirror unit according to claim 1, wherein
   the light source is formed of a plurality of light emitting diodes surface-mounted on a flexible substrate,
   the flexible substrate is fixed to the lamp lens, and
   the reflection surface is set corresponding to each of the light emitting diodes, and is formed of at least one of a flat reflection surface and a curved reflection surface.

7. The vehicle outside-mirror unit according to claim 1, wherein
   the light source is formed of a plurality of light emitting diodes surface-mounted on a flexible substrate,
   the flexible substrate is fixed to the lamp lens, and
   the reflection surface is set corresponding to each of the light emitting diodes, and is formed of a flat reflection surface in a pyramid shape and a curved reflection surface of a paraboloid of revolution with an emission point of the light emitting diode being a substantial focal point.

8. The vehicle outside-mirror unit according to claim 1, wherein
   the light source is formed of a plurality of light emitting diodes surface-mounted in an array shape on a belt-like flexible substrate,
   the flexible substrate is fixed to the lamp lens, and
   the reflection surface includes an inverted V-shaped flat reflection surface and a V-shaped flat reflection surface provided along the array of the light emitting diodes, and a curved reflection surface of a paraboloid of revolution with an emission point of the light emitting diode being a substantial focal point, the curved reflection surface being provided corresponding to each of the light emitting diodes.

9. The vehicle outside-mirror unit with the lamp unit according to claim 1, wherein
   the light source is formed of a plurality of light emitting diodes surface-mounted in an array shape on a belt-like flexible substrate,
   the flexible substrate is fixed to the lamp lens,
   the reflection surface includes an inverted V-shaped flat reflection surface and a V-shaped flat reflection surface provided along the array of the light emitting diodes, and a curved reflection surface of a paraboloid of revolution with an emission point of the light emitting diode being a substantial focal point, the curved reflection surface being provided corresponding to each of the light emitting diodes, and
   the curved reflection surface corresponding to a wrap-around portion of the mirror housing functions as a turn lamp.

10. The vehicle outside-mirror unit with the lamp unit according to claim 1, wherein the shielding portion is an edge of the window in the lamp housing, and provided at a position of the lamp lens corresponding to a position where the light source is fixed.

* * * * *